US012699861B1

(12) United States Patent (10) Patent No.: US 12,699,861 B1
Flores et al. (45) Date of Patent: Aug. 4, 2026

(54) SYSTEMS AND METHODS OF SECURING ACCESS AND READABILITY OF OPTICALLY STORED DATA

(71) Applicant: United Services Automobile Association (USAA), San Antonio, TX (US)

(72) Inventors: Christopher Edward Flores, San Antonio, TX (US); Priyadarshini Badugu, Frisco, TX (US); Subhalakshmi Selvam, Allen, TX (US); Timothy Blair Chalmers, San Antonio, TX (US); Gregory Brian Meyer, San Antonio, TX (US); Heather Hernandez, San Antonio, TX (US); Kenan Neil Bubela, Boerne, TX (US)

(73) Assignee: United Services Automobile Association (USAA), San Antonio, TX (US)

( * ) Notice: Subject to any disclaimer, the term of this patent is extended or adjusted under 35 U.S.C. 154(b) by 0 days.

(21) Appl. No.: 19/175,483

(22) Filed: Apr. 10, 2025

Related U.S. Application Data

(60) Provisional application No. 63/632,268, filed on Apr. 10, 2024.

(51) Int. Cl.
*G06K 7/10* (2006.01)
*G06F 21/16* (2013.01)
(Continued)

(52) U.S. Cl.
CPC ....... *G06K 19/06037* (2013.01); *G06F 21/16* (2013.01); *G06K 7/10594* (2013.01);
(Continued)

(58) Field of Classification Search
CPC ......... G06K 19/06037; G06K 7/10594; G06K 7/10821; G06K 2007/10485; G06F 21/16; H04L 9/0819; H04L 2209/608
See application file for complete search history.

(56) References Cited

U.S. PATENT DOCUMENTS 6,266,299 B1 * 7/2001 Oshima ............. G11B 11/10584

OTHER PUBLICATIONS

Basini, M., et al.; "Terahertz electric-field-driven dynamical multiferroicity in SrTiO3," Nature 628, Apr. 18, 2024, pp. 534-539. https://doi.org/10.1038/s41586-024-07175-9.

* cited by examiner

Primary Examiner — Jamara A Franklin
(74) Attorney, Agent, or Firm — Fletcher Yoder, PC

(57) ABSTRACT

An optical data system includes an optical storage medium including a watermark region, a read subsystem, and a control system. The watermark region is encoded with an encryption key to provide information about embedded data. The read subsystem includes a base used to support the optical storage medium, a laser system used to focus light from one or more lasers, and one or more detectors used to read the embedded data from the optical storage medium based on the light interacting with the optical storage medium. The control system includes one or more processors and a memory that stores instructions to control the read subsystem to scan the watermark region to provide scan data, identify the encryption key based on the scan data, and generate computer readable data using the encryption key to decrypt the embedded data from the optical storage medium.

20 Claims, 8 Drawing Sheets

(51) Int. Cl.
G06K 19/06 (2006.01)
H04L 9/08 (2006.01)
(52) U.S. Cl.
CPC ........ G06K 7/10821 (2013.01); H04L 9/0819
(2013.01); *G06K 2007/10485* (2013.01); *H04L*
*2209/608* (2013.01)

─220

CONTROL THE LASER SYSTEM TO READ DATA IN THE WATERMARK REGION OF THE OPTICAL STORAGE MEDIUM ─222

DETERMINE, VIA THE CONTROL SYSTEM, THE ENCRYPTION KEY OF THE OPTICAL STORAGE MEDIUM ─224

GENERATE DECRYPTED AND READABLE DATA USING THE ENCRYPTION KEY TO DECRYPT EMBEDDED DATA READ FROM THE BULK STORAGE REGION OF THE OPTICAL STORAGE MEDIUM ─226

SYSTEMS AND METHODS OF SECURING ACCESS AND READABILITY OF OPTICALLY STORED DATA

CROSS-REFERENCE TO RELATED APPLICATIONS

The present application claims priority to and the benefit of U.S. Provisional Application No. 63/632,268, entitled "SYSTEMS AND METHODS OF SECURING ACCESS AND READABILITY OF OPTICALLY STORED DATA," filed on Apr. 10, 2024, the disclosure of which is incorporated by reference herein in its entirety for all purposes.

BACKGROUND

The present disclosure generally relates to systems and methods for forming an optical storage medium to allow writing and reading of data. More specifically, the present disclosure relates to secure storage and retrieval of data within an optical storage medium.

This section is intended to introduce the reader to various aspects of art that may be related to various aspects of the present techniques, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

Optical storage of data includes writing data on physical materials to generate long-term storage solutions. It is currently known, that traditional optical data storage mediums (e.g., compact discs, blue-ray discs, digital versatile discs) offer increased durability (e.g., decrease in loss of data due to power failure and/or wear) when compared to traditional volatile memory devices. However, optical storage mediums are limited in data storage capacity and access control compared to traditional volatile devices. As such, there is a need for a secure and accessible optical storage medium with increased data storage capacity.

SUMMARY

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

In one embodiment, an optical data system includes an optical storage medium including a watermark region, a read subsystem, and a control system. The watermark region is encoded with an encryption key to provide information about embedded data. The read subsystem includes a base used to support the optical storage medium, a laser system used to focus light from one or more lasers, and one or more detectors used to read the embedded data from the optical storage medium based on the light interacting with the optical storage medium. The control system includes one or more processors and a memory that stores instructions to control the read subsystem to scan the watermark region to provide scan data, identify the encryption key based on the scan data, and generate computer readable data using the encryption key to decrypt the embedded data from the optical storage medium.

In one embodiment, an optical data system includes an optical storage medium. The optical storage medium includes a watermark region, a base, a laser system, and a control system. The watermark region of the optical storage medium is encoded with an encryption key to decode embedded data stored on the optical storage medium. The base supports the optical storage medium and rotate the optical storage medium about an axis. The laser system includes one or more lasers used to focus light on or through one or more surfaces of the optical storage medium. The laser system also includes one or more detectors to read the embedded data from the optical storage medium based on the light interacting with the optical storage medium. Further, the control system includes one or more processors and a memory storing instructions executable by the control system. The control system controls rotation of the optical storage medium about the axis, controls the laser system to focus the light on the watermark region, and controls the one or more detectors to read the encryption key based on an interaction of the light with the watermark region. Further, the control system controls the laser system to focus the light on other locations on or within the optical storage medium and controls the one or more detectors to read the embedded data. In this manner, the control system generates computer readable data using the encryption key to decrypt the embedded data read by the one or more detectors.

In one embodiment, a method of controlling a control system is provided. The control system may control a laser system to read data within a watermark region of an optical storage medium and to read embedded data within a bulk storage region of the optical storage medium. The control system may also determine an encryption key based on the data within the watermark region of the optical storage medium and generate decrypted and readable data using the encryption key to decrypt the embedded data read from the bulk storage region of the optical storage medium.

BRIEF DESCRIPTION OF THE DRAWINGS

These and other features, aspects, and advantages of the present disclosure will become better understood when the following detailed description is read with reference to the accompanying drawings in which like characters represent like parts throughout the drawings, wherein.

DETAILED DESCRIPTION

Figure 1:
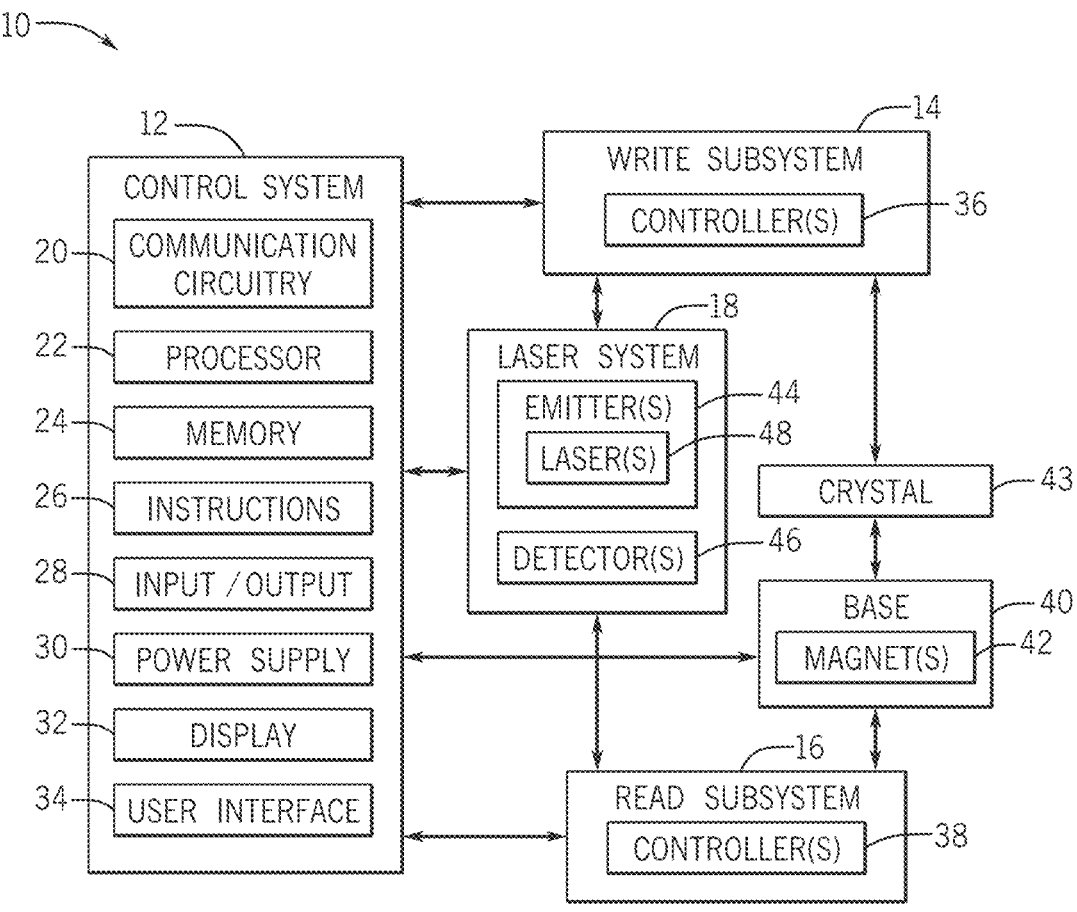
FIG. 1 is a block diagram of an optical data system, in accordance with an embodiment of the present disclosure.

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," and "the" are intended to mean that there are one or more of the elements. The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features.

It is now recognized that there is a growing need for reliable data storage with increased capacity and storage lifetimes. As digitization of information increases, during an era of big data, demands for efficient and long-term storage call for advancement beyond traditional storage solutions. It is presently known, that traditional magnetic data storage (e.g., hard drives, magnetic tapes) suffer from limited capacity per disk and necessities continuous data migration to avoid data loss. Limited storage capacity of traditional magnetic data storage increases footprints of data storage facilities, energy demands to meet data storage energy consumption, and continuous migration of data to prevent loss. Traditional optical data storage mediums (e.g., compact discs, blue-rays, digital versatile discs) offer increased data storage lifetimes as data is optically written on surfaces but suffers from limited storage capacity due to optical writing constrictions due to the diffraction limit of light. Additionally, traditional optical data storage may have limited security features to regulate access control. As such, there is a need for optical storage mediums with increased data storage capacities and features to ensure secure access control.

In view of the foregoing, present embodiments are generally directed to systems and methods that may be used to read and/or write embedded data (e.g., stored data) of an optical data system. The optical data system includes an optical storage medium that includes one or more surfaces and/or one or more crystal structures. As such, the optical storage medium may offer three-dimensional storage solutions increasing storage capacity of the optical storage medium compared to traditional optical data storage mediums (e.g., two-dimensional data storage). In some embodiments, the optical storage medium may include a layered crystalline structure that may include the embedded data. The layered crystalline structure may include a layer of the optical storage material embedded with a watermark region. The watermark region may include an encryption key needed to decrypt and/or decode data stored within the optical storage material (e.g., a bulk storage region). As such, the optical storage medium may offer increased data storage capacity and secure access.

Additionally, the present disclosure relates to systems and methods of partitioning data within an optical storage medium. The optical storage medium may be formed using a layer-by-layer process. A control system of the optical data system may be used to control a read subsystem, a write subsystem, and/or a laser system to initiate formation of the optical storage medium via the layer-by-layer process. As such, the control system may receive instructions based on a partition map including partition map coordinates generated through implementation of a machine learning (ML) model to control the layer-by-layer process. For example, a base layer, a first layer, a second layer, and one or more additional layers may be formed by the optical data system defining a crystal structure. The optical data system may encode first data into the first layer through modification of a first state of a first portion of the crystal structure within the first layer.

In certain embodiments, a portion of the optical storage medium may include a header region. The header region may be encoded with lifespan data indicative of a write date of the one or more layers of the optical storage medium. As such, a health state may be determined based on a correlation of the write date and a decay state of the optical storage medium. The decay state may be based on a readability of the embedded data of the optical storage medium. For example, one or more detectors of the read subsystem may be used to determine an efficacy of the embedded data of the optical storage medium compared to a known calibration value. The known calibration data may be defined during the partitioning of data within the optical storage medium via the layer by layer process. In this manner, the health state of the optical storage medium may be used to determine if the embedded data is viable for continued long-term storage.

FIG. 1 is a block diagram of an optical data system 10, in accordance with an embodiment of the present disclosure. The optical data system 10 may be used to form, read, and/or write embedded data on an optical storage medium. The optical data system 10 may include a control system 12, a write subsystem 14, a read subsystem 16, and a laser system 18. The control system 12 may include communication circuitry 20, one or more processors 22, a memory 24, instructions 26, an input/output (I/O) port 28, a power supply 30 (e.g., wired power, a battery), a display 32, a user interface 34, and the like. The control system 12 may enable communication between various components (e.g., write subsystem 14, read subsystem 16, laser system 18, a base) of the optical data system 10. It should be noted, that one or more of the various components of the optical data system 10 may be omitted.

The communication circuitry 20 may facilitate wired or wireless communication between various components of the control system 12 as well as with external devices (e.g., mobile device, tablets, personal devices, etc.). The one or more processor 22 may be any suitable type of computer processor or microprocessor capable of executing computer-executable code. Moreover, the processor 22 may include multiple microprocessors, one or more "general-purpose" microprocessors, one or more special-purpose microprocessors, and/or one or more application specific integrated circuits (ASICs), or some combination thereof. For example, the processor 22 may include one or more than one reduced instruction set (RISC) or complex instruction set (CISC) processors. In some embodiments, the processor 22 may receive inputs transmitted from the user interface 34 and communicate with the write subsystem 14 using the communication circuitry 20. For example, an input with an instruction to read a portion of the optical storage medium may initiate communication between the control system 12, the write subsystem 14 and the laser system 18.

The memory 24 of the control system 12 may also be used to store the data, various other software applications, and the like that are executed by the processors 22. The memory 24 may represent non-transitory computer-readable media (e.g., any suitable form of memory or storage) that may store the processor-executable code used by the processors 22 to perform various techniques described herein. The processors 22 may be configured to execute instructions 26. The instructions 26, when executed by the processors 22, may enable the control system 12 to control the user interface 34 to selectively query a user to define coordinates regarding a map presented on the display 32. The user interface 34 may include the display 32 that is configured to display text or images transferred to it from the one or more processors 22. In addition to and/or alternative to the display 32, the user interface 34 may include other devices for interfacing with the user, such as lights (e.g., LEDs), speakers, and the like. The I/O ports 28 may be interfaces that may couple to other peripheral components such as input devices (e.g., keyboard, mouse), sensors, input/output (I/O) modules, and the like. The power supply 30 may provide power to one or more components of the control system 12.

The write subsystem 14 may include one or more write controllers 36 and may be coupled to the control system 12. The read subsystem 16 may include one or more read controllers 38 and be coupled to the control system 12. The controllers 36, 38 may control writing and/or reading of embedded data within the optical storage medium. For example, the read subsystem 16 may receive a request from the control system 12 to read a requested portion of data from the optical storage medium. As such, the read controller 38 may control the read subsystem 16 to communicate with the laser system 18 to output scan data relating to the requested portion of data. In some embodiments, the optical data system 10 may also include a base 40. The base may include one or more magnets 42 used to support a crystal 43 (e.g., the optical storage medium) during interaction with the write subsystem 14 and/or the read subsystem 16. For example, the magnets 42 may be used to levitate the crystal 43, rotate the crystal 43, and/or a combination thereof via magnetics (e.g., magnetic field generation) during operation of the optical data system 10. In some instances, the base 40 may be in direct contact with the crystal 43.

The laser system 18 of the optical data system 10 may include one or more emitters 44 and/or one or more detectors 46. The emitters 44 may include one or more lasers 48, one or more LEDs, arc lamps, tungsten halogen sources, IR emitters, deuterium light sources, and the like. The lasers 48 may generate light through stimulated emission and may include a continuous wave laser, a pulsed laser, a quasi-continuous wave laser, or a combination thereof. The emitters 44 may emit light across the electromagnetic spectrum through a diffuse and/or a continuous source. For example, the emitters 44 may emit light ranging from ultraviolet to long wave infrared. In this manner, the emitters 44 may emit light ranging from 157 nm to 220 nm, 200 nm to 400 nm, 400 nm to 600 nm, 480 nm to 880 nm, and/or 880 nm to 1800 nm. The lasers 48 may emit light at a single frequency (e.g., continuous, pulsed) that may include 157 nm, 248 nm, 257 nm, 454 nm, 488 nm, 530 nm, 632 nm, 676 nm, 780 nm, 1064 nm, and the like. The lasers 48 may include gas lasers, solid-state lasers, fiber lasers, liquid lasers, semiconductor lasers, laser diodes, tunable lasers, or a combination thereof. The detectors 46 may be used in combination with the read subsystem 16 to read the embedded data of the crystal 43. The detectors 46 may include a thermal imager, a complementary metal-oxide-semiconductor (CMOS) camera, a charge-coupled device (CCD), electron-multiplier charge-coupled device (EMCCD), one or more photodiodes, pyro-electric sensors, one or more photodetectors, a photomultiplier tube (PMT), and/or other suitable detectors.

In some embodiments, the optical data system 10 forms the optical storage medium via the layer-by-layer process. The layer-by-layer process is executed based on instructions 26 provided to the controller 36 of the write subsystem 14. The instructions 26 may include defining the one or more layers of the layer-by-layer process based on a map (e.g., a partition map). The map may be generated on the display 32 of the user interface 34 and prompt the user to define the layers of the crystal 43. For example, the user may input instructions into the user interface 34 to direct the control system 12 to perform one or more state change operations of the layers of the crystal 43based on selected coordinates on the map. The state change operations may be performed by controlling the write subsystem 14 of the optical data system 10 to control relative movement of the lasers 48 of the laser system 18 and the base 40 to write data to the crystal 43corresponding to a portion of the crystal 43associated with the coordinates on the map. It may be advantageous for the map of the optical data system 10 to be displayed on the user interface 34.

Figure 2:
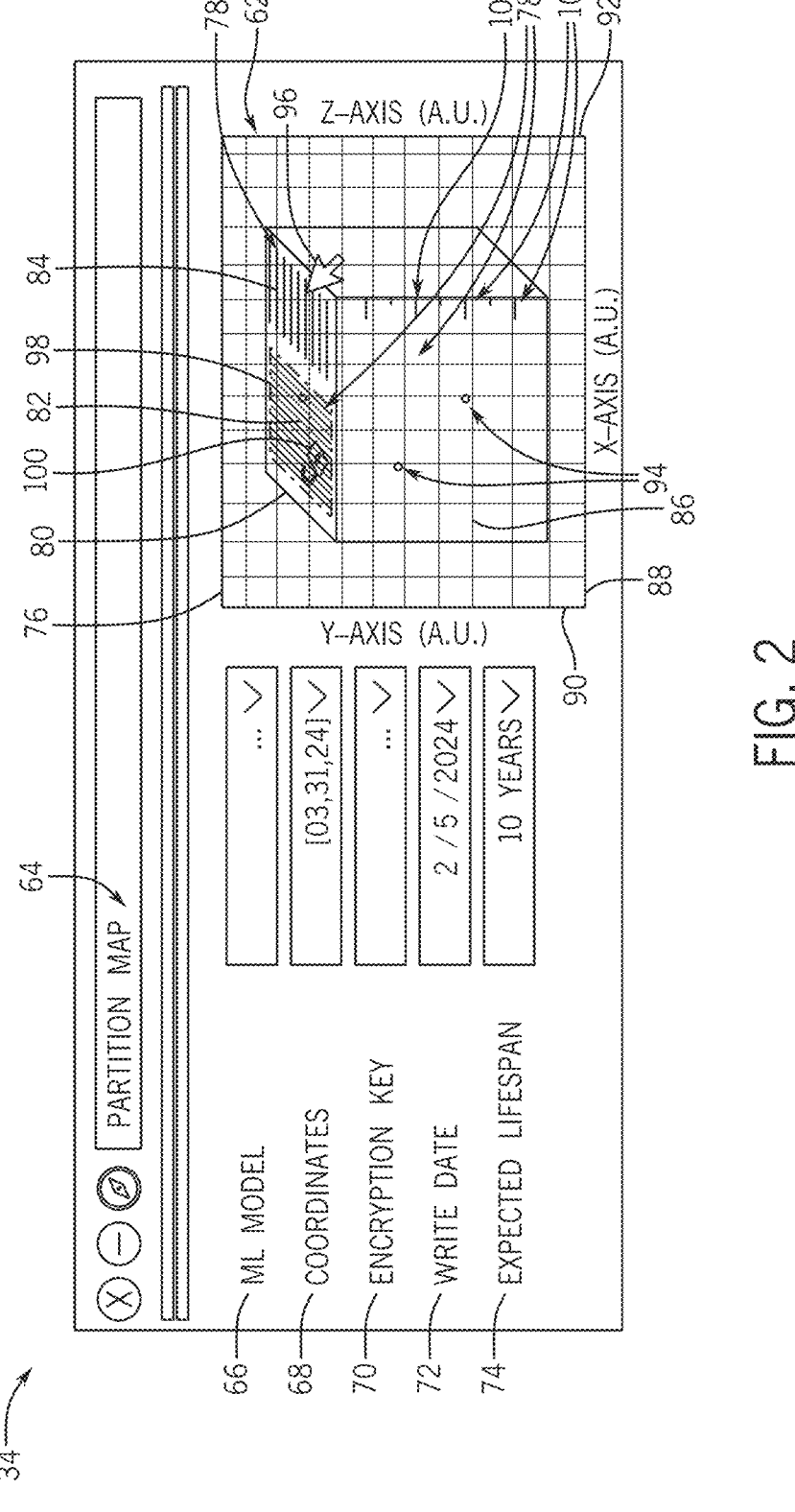
FIG. 2 is a schematic diagram of a user interface of the optical data system, in accordance with an embodiment of the present disclosure.

FIG. 2 is a schematic diagram of a user interface 34 of the optical data system 10, in accordance with an embodiment of the present disclosure. The user interface 34 may display a screen 62 having a partition map dashboard 64 that may allow the user to select, view, and/or manage one or more inputs. The partition map dashboard 64 may include various widgets prompting the user for inputs, providing notifications, outputting data decryption, and the like. For example, the various widgets may include a machine learning (ML) model widget 66, a coordinates widget 68, an encryption key widget 70, a write date widget 72, an expected lifespan widget 74, or a combination thereof. The user interface 34 may display a partition map 76 that may include one or more geometric regions 78 of an optical storage medium 80. As such, the user may define a watermark region 82, a header region 84, a bulk storage region 86, and one or more additional regions of the optical storage medium 80. The user may also submit data read requests and/or perform other functions related to operation of the optical data system 10 via the user interface 34. It should be noted, that the screen 62 including the partition map dashboard 64 is one non-limiting example of the user interface 34 and the user interface 34 may include various screens and/or various dashboards.

It should be recognized that while the illustrated embodiment shows the partition map dashboard 64 including the machine learning (ML) model widget 66, the coordinates widget 68, the encryption key widget 70, the write date widget 72, and the expected lifespan widget 74 on the same screen, the user interface 34 may display each of these widgets on separate screens of the partition map dashboard 64 and/or may allow a user to select which widgets will be shown, the placement of such widgets, and so forth. Additionally, in certain embodiments one or more conditions or rules may be created or parameterized by the user to control when and/or where a widget is displayed, such as prompting display or updating of a widget in response to updated data monitored by the widget (e.g., display of a widget or placement of the widget may be updated in response to the data conveyed by the widget changing or being updated). Additionally or alternatively, the screen via the partition map dashboard 64, may display any combination of the ML model widget 66, the coordinates widget 68, the encryption key widget 70, the write date widget 72, and the expected lifespan widget 74.

In some embodiments, the partition map 76 includes a three-dimensional coordinate system with an x-axis 88, a y-axis 90, and a z-axis 92. The three-dimensional coordinate system as illustrated includes arbitrary units, however, it should be noted that units of the x-axis 88, the y-axis 90, and the z-axis may include any suitable measure of three-dimensional space including nanometers, millimeters, and the like. The partition map 76 of the user interface 34 may allow the user to input one or more coordinates 94 via the coordinates widget 68. Additionally and/or alternatively, the user may use a selection tool 96 to select the coordinates 94 and/or define the geometric regions 78. In some instances, the user may define the geometric regions 78 using a selection box 98. For example, as shown, the selection box 98 corresponds to the watermark region 82 of the optical storage medium 80. The watermark region 82 of the optical storage medium 80 may be selected to be included on a layer, a surface, and/or a single facet of a multifaceted crystalline structure of the optical storage medium 80. As such, the watermark region 82 may be included in a first region of the optical storage medium 80 to allow the read subsystem 16 to readily read an encryption key 100 embedded and/or encoded in the watermark region 82. The encryption key 100 may include a sequence of bits of variable length, an encryption algorithm (e.g., symmetric, asymmetric), or other suitable encryption keys. The encryption key 100 may be used to decode data (e.g., apply an algorithm) and output plain text (e.g., decrypted data) to provide information about embedded data of the optical storage material. As such, the data embedded in the bulk storage region 86 of the optical storage medium 80 may use the encryption key 100 to allow the read subsystem 16 to read embedded data. For example, the control system 12 may control the read subsystem 16 to scan the watermark region 82 to provide scan data (e.g., ciphertext). The control system 12 may identify the encryption key 100 based on the scan data and generate computer readable data using the encryption key 100 to decrypt the embedded data from the optical storage medium 80. In this manner, the encryption key 100 may be used to provide security and control access to data embedded on the bulk storage region 86 of the optical storage medium 80.

In some embodiments, one or more additional encryption keys may be included within the watermark region 82. For example, a first additional encryption key may be included to access a particular data set. The particular data set may include information related to reading embedded data of the optical storage medium 80. In this manner, the data set may include a number of lasers, a read angle, a frequency of light (e.g., laser frequency for reading, tunable frequency), and/or a power required for activation of the embedded data of the optical storage medium 80. In some instances, the read angle may active the embedded data of the optical storage medium 80 when directed at one or more chromophore centers. The chromophore centers may have one or more activations levels based on interaction with the lasers of the read subsystem 16. In this manner, activation of the storage point of the optical storage medium 80 may correspond emission of one or more wavelengths of light from the chromophore centers of the optical storage medium 80 based on electronic band gap activation. Additionally and/or alternatively, a second additional encryption key may be used to control a magnetic field to tune one or more characteristics of the chromophore centers of the optical storage medium. In this manner, electronic band gap emission may be excited to emit one or more colors associated with the embedded data on the optical storage material. As such, additional encryption keys may provide additional security levels to protect data from decryption without authorization. Further, use of the chromophore centers may allow for dense memory storage (e.g., multi-dimensional) as a single chromophore center may produce multiple outputs corresponding to specific activation by a particular laser, a particular frequency, a particular power, and/or a particular magnetic field.

The partition map dashboard 64 may be used to define a process of partitioning data within the optical storage medium 80 prior to forming one or more crystal structures through deposition of various layers via the layer-by-layer process. The process of partitioning data may be provided to the control system 12 of the optical data system 10 as instructions 26 to control the write subsystem 14, the read subsystem 16, and/or the laser system 18 to form the optical storage medium 80. As such, the partition map 76 may define a first layer, a second layer, and/or additional layers deposited during the layer-by-layer process. The first layer may correspond to a first partition including the coordinates 94 corresponding to the first layer. For example, the first partition may comprise mapping at least a portion of the optical storage medium 80 to generate the partition map 76 (e.g., a map) that includes the first layer and define coordinates of the partition map 76 corresponding to the first layer. The second layer may correspond to a second partition and may include the coordinates 94 corresponding to the second layer. In some embodiments, the partition map 76 may include coordinates 94 of one or more physical markers 102. The physical markers 102 may be located on the partition map 76 in such a way to delineate the layers. As such, the physical markers 102 (e.g., dye, lithographic etching) may be added to the optical storage medium 80 during the layer-by-layer process based on the coordinates 94 of the partition map 76.

The partition map 76 may be built based on implementation of a machine learning (ML) model. The ML model may be selected by the user from one or more ML models via the ML model widget 66. In some embodiments, the ML model may be generated using a supervised, an unsupervised, a reinforcement learning method, and/or additional suitable methods. The ML model may be based on one or more parameters related to changing a state of a portion of the optical storage medium 80. The one or more parameters may include an oxidation state, a defect state, a trapped state, a luminescence state, a refractive index, a magnetic state, an electron state, a crystal structure, or the like. As such, the ML model may use the parameters during training and/or execution to determine a proper partition map based on parameters of a requested model. For example, the requested model may include parameters that include changing the electronic states of portions of the optical storage medium 80 to embed data into a layer of crystalline structure formed during the layer-by-layer process. The ML model may use data based on photonic states of the formed crystal structure to determine the ability of the laser system 18 to trap electronic states for long-term storage within the optical storage medium 80. As such, the coordinates 94 of each layer of the optical storage medium 80 may be output by the requested model based on an anticipated change to the electronic state of a portion of the optical storage medium 80. In this manner, considerations of complex combinations of changes to portions of the optical storage medium may be executed. The ML model may access various databases including crystallographic databases, structural databases, and the like to determine how changing the state of the portion of the optical storage medium 80 may change the one or more parameters.

In certain embodiments, the user interface 34 may include the write date widget 72 and the expected lifespan widget 74. The write date widget 72 may prompt the user to input a write date in which the optical storage medium 80 is written on by the write subsystem 14. As such, the expected lifespan widget 74 may autogenerate displaying a life expectancy (e.g., a predicted useful lifespan, a predicted value of useful life) based on an expected lifespan. The expected lifespan may be based on a predetermined amount of time (e.g., months, years, decades) in which the optical storage medium 80 is anticipated to store data that is readable by the read subsystem 16. The write date and the expected lifespan may be embedded in the header region 84 of the optical storage medium 80. A location of the header region 84 may be defined based on a set of coordinates of the partition map 76. As such, the read subsystem 16 may use the partition map 76 to write the write date and expected lifespan within the header region 84 of the optical storage medium 80 based on the inputs made to the partition map dashboard 64. It should be noted that additional data may be embedded into the header region 84 of the optical storage medium 80.

Figure 3:
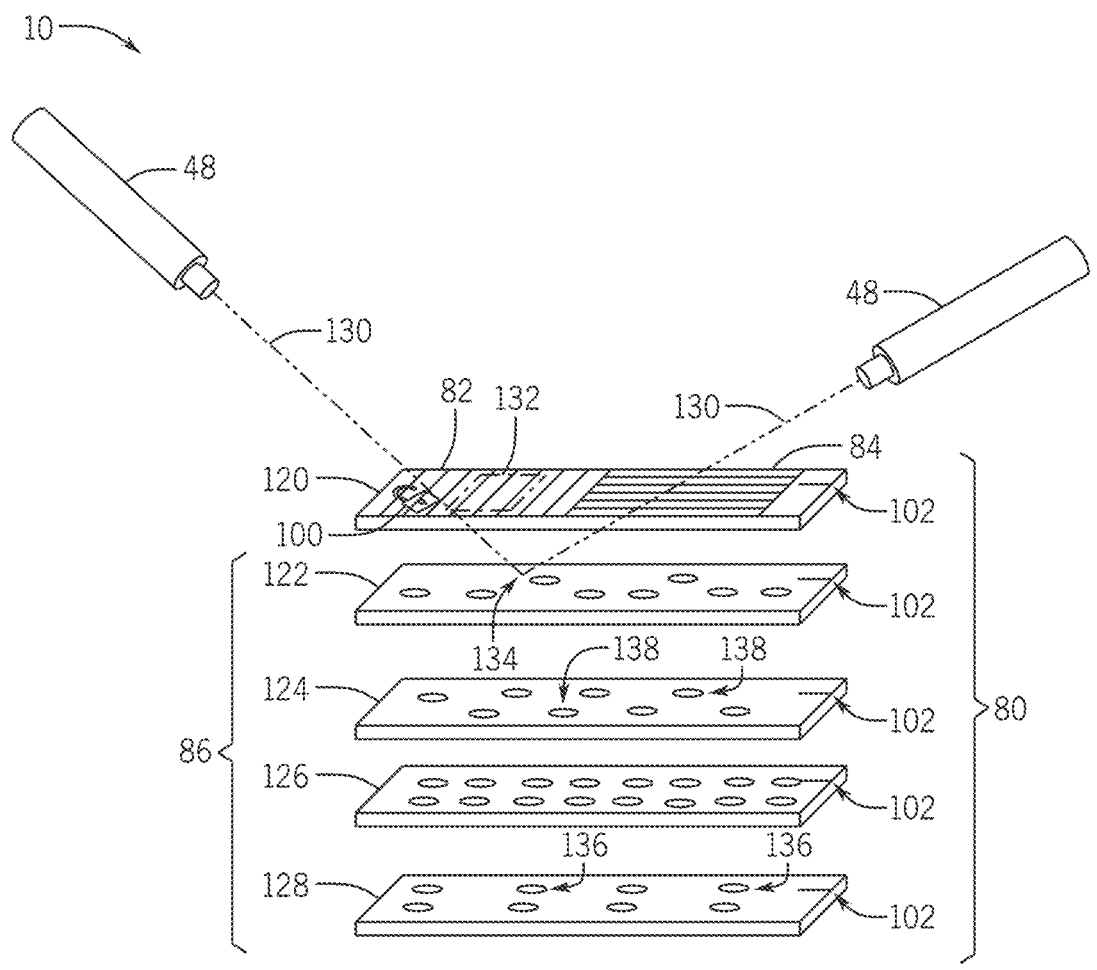
FIG. 3 is a schematic diagram of the optical data system formed via a layer-by-layer process, in accordance with an embodiment of the present disclosure.

FIG. 3 is a schematic diagram of the optical data system 10 formed via a layer-by-layer process, in accordance with an embodiment of the present disclosure. In particular, FIG. 3 includes an exploded view of an illustrative embodiment of the optical data system 10. The optical storage medium 80 is formed through deposition of one or more layers via the layer-by-layer process. The various layers may include a first layer 120, a second layer 122, a third layer 124, a fourth layer 126, and a base layer 128. It should be noted, that the optical storage medium 80 of FIG. 3 is one non-limiting example and that, in accordance with present embodiments, optical storage mediums of various amounts of layers may be formed including all, a portion, or additional layers relative to the layers illustrated. The layer-by-layer process may include deposition of the various layers to form a crystal structure of the optical storage medium 80. The crystal structure may be based on crystallographic characteristics of the optical storage medium 80. The crystallographic characteristics may include repetition of one or more unit cells (e.g., cubic, face-centered cubic, body-centered cubic, hexagonal, orthorhombic, etc.), crystal lattice spacing, crystal defect states, crystal trapped states, and the like. The layer-by-layer process may include deposition of material (e.g., fluorescent films, nanostructures, chemical films, etc.) of the optical storage medium 80 through lithography, evaporation, laser ablation, chemical formation, and the like.

In some embodiments, the layer-by-layer process forms and encodes data within the optical storage medium 80. The layer-by-layer process (e.g., partitioning data process) may be performed iteratively. For example, the first layer 120 of the optical storage medium 80 may be deposited followed by encoding first data within the first layer 120 through activation of the write subsystem 14. The first data may include the encryption key 100 and may be based on a first assigned partition corresponding to the watermark region 82. The first assigned partition may be assigned by the partition map 76 and may provide instructions to the control system 12 to control relative movement of the one or more lasers 48 of the write subsystem 14 to embed data on a surface of the first layer 120. As such, the write subsystem 14 modifies a first state 132 of the watermark region 82 (e.g., a first portion) of the first layer 120 of the optical storage medium 80. Modifying the first state 132 of the watermark region 82 may include embedding the encryption key 100 and/or additional information that may be read by the read subsystem 16 throughout use of the optical storage medium 80.

The write controller 36 of the write subsystem 14 may communicate with the laser system 18 to control one of the lasers 48 to focus light on the first layer 120 to form a light beam 130 that may change aspects (e.g., oxidation state, trapped state, luminescence state, refractive index, magnetic state, electronic state, or the like) of the crystal structure at the first layer 120. As such, the encryption key 100 may be encoded into the first layer 120 (e.g., designated watermark region 82) by emitting light into the optical storage medium 80. Further, the second layer 122 may be deposited on the first layer 120 and second data may be encoded within the second layer 122. The second data may be based on a second assigned partition associated with the second layer 122 as defined by the partition map 76. The second data may be embedded into the second layer 122 of the optical storage medium 80 via the write subsystem 14 controlling the laser system 18 to perform change state operations (e.g., change aspects of the crystal structure). In some instances, a header region 84 (e.g., a second portion) of the first layer 120 may be encoded with lifespan data. The lifespan data may be embedded via the light beam 130 from the laser 48 of the laser system 18. The lifespan data may include the write date in which the optical storage medium 80 was formed and/or embedded with data.

In certain embodiments, the write subsystem 14 may embed data by changing states of various portions of the bulk storage region 86 of the optical storage medium 80. The bulk storage region 86 may include one or more layers. For example, as shown, the bulk storage region 86 may include the second layer 122, the third layer 124, the fourth layer 126, and the base layer 128. The bulk storage region 86 may be formed by the layer-by-layer process and encoded with data. The data embedded within the bulk storage region 86 may be encrypted. In some instances, the control system 12 may control the laser system 18 to write to the optical storage medium 80 on or through the one or more layers 120, 122, 124, 126, 128 and/or one or more surfaces of the optical storage medium 80 by focusing two or more lasers 48 on a location 134 of the optical storage medium 80 to write the embedded data based on the encryption key 100. A point at which the two or more lasers 48 cross may generate conditions for state change. Further, the encryption key 100 may be used to encrypt and/or decrypt the embedded data. In some instances, data is embedded within the bulk storage region 86 during the layer-by-layer process (e.g., partitioning data process). For example, first bulk data 136 may be encoded on the surface of the base layer 128. The first bulk data 136 may be embedded by changing the state of the base layer 128 (e.g., by crossing two or more layers at locations on the base layer 128). Additionally and/or alternatively, second bulk data 138 may be encoded on the surface of the third layer 124. The second bulk data 138 may include embedded data that may be decoded by the encryption key 100.

In some embodiments, the write subsystem 14 may embed data by changing the magnetic state of various portion of the bulk storage region 86 of the optical storage medium 80. The magnetic state may be changed by applying an external magnetic field to the optical storage medium 80 during the layer-by-layer process. In this manner, a band gap energy of the optical storage medium 80 may be tuned as the magnetic field is applied. Changes in the band gap energy may allow the write subsystem 14 to embed additional data within the optical storage medium 80 that may be readable when the magnetic field is applied to the optical storage medium 80 tuning the band gap energy. As such, magnetic field induced shifting of the band gap energy by the write subsystem 14 may allow for one or more additional layers of the optical storage medium 80 to be accessed to increase data storage density.

In certain embodiments, the layer-by-layer process forms the optical storage medium 80 through deposition of a first layer 120, a second layer 122, a third layer 124, a fourth layer 126, and a base layer 128 prior to encoding data within the optical storage medium 80. That is, the optical storage medium 80 may be formed prior to encoding and/or embedding data. In some instances, it may be advantageous to mark the layers formed during the layer-by-layer process for use by the write subsystem 14 and/or the read subsystem 16. As such, the partitioning process may include addition of various physical markers 102 positioned between each layer of the optical storage medium 80 to delineate and/or mark each layer of the optical storage medium 80. The physical markers 102 may be generated by injecting a dye or forming a marker from dyed layering material. For example, the dye may be a fluorescent marker that may include polymer dyes, small organic dyes, quantum dots, and/or a combination thereof. The fluorescent markers may emit light detectable by the laser system 18 to indicate the position of each layer of the optical storage medium 80. In some cases, the physical markers 102 are formed through laser ablation and/or lithographic masking protocols to allow various locations of the layers of the optical storage medium 80 to be readably decipherable by the read subsystem 16. The physical markers 102 may allow for locating one or more layers of the optical storage medium 80 after formation based on a known coordinate of the physical markers 102 and/or scanning the optical storage medium 80 for the physical markers 102 via the read subsystem 16.

Figure 4:
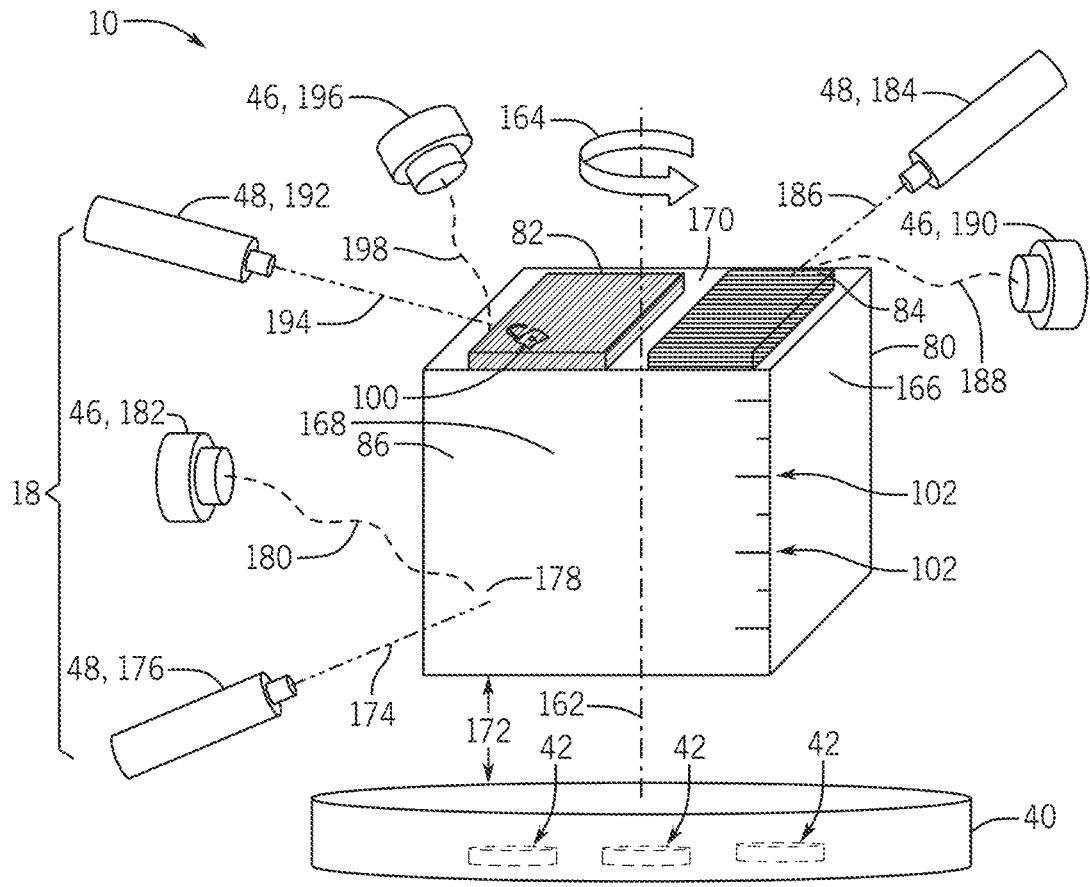
FIG. 4 is a schematic diagram of the optical data system, in accordance with an embodiment of the present disclosure.

FIG. 4 is a schematic diagram of the optical data system 10, in accordance with an embodiment of the present disclosure. The optical data system 10 may include and control operation of the write subsystem 14, the read subsystem 16, the laser system 18, and/or the base 40. As shown in the illustrated embodiment, the optical storage medium 80 may include a watermark region 82, a header region 84, and a bulk storage region 86 that includes one or more crystal structures storing data (e.g., embedded data, stored data). In some instances, the one or more crystal structures include a layered crystalline structure with one or more surfaces, such as surfaces 166, 168, and 170. The read subsystem 16 may control the laser system 18 to focus light on or through the surfaces 166, 168, and 170 of the optical storage medium 80. In some instances, the detectors 46 of the laser system 18 may read the data based on light interaction with the optical storage medium 80. The control system 12 may then use the encryption key 100 to generate computer readable data (e.g., readable data) based on the data read by the detectors 46. For example, the control system 12 may utilize the encryption key 100 as part of a hash function to encrypt the data read by the detectors 46. In some instances, the control system 12 may utilize an encryption algorithm (e.g., Triple Data Encryption Standard, Advanced Encryption Standard, Blowfish, and/or a National Institute of Standards and Technology standardized encryption algorithms) with the encryption key 100 (e.g., symmetric key, asymmetric key) to scramble data read by the detectors 46 into ciphertext. In this manner, ciphertext may be unscrambled using the encryption key 100.

As shown, the optical storage medium 80 may be levitated by the base 40 via the magnets 42. In some embodiments, the base 40 may generate a magnetic field that may be repelled by the optical storage medium 80. In some instances, the optical storage medium 80 may be diamagnetic. In this manner, the optical storage medium 80 may repel the magnetic field of the base 40 and levitate due to a repulsive force. Diamagnetic optical storage medium may include superconductors, pyrolytic carbon, bismuth, mercury, diamond, graphite, copper, silver, and the like. In certain embodiments, the optical storage medium 80 may be positioned on a magnetic support including one or more magnets that oppose the magnetic field generated by the base 40. In this manner, the base 40 may levitate the optical storage medium 80 based on interactions of the magnetic field with the magnetic support of the optical storage medium 80. Further, the control system 12 may control the base to cause the optical storage medium 80 to rotate upon an axis 162. The control system 12 may initiate rotation (e.g., control rotation) of the optical storage medium 80 about the axis 162 in a direction of rotation 164 that may allow the read subsystem 16 to read data from one or more surfaces 166, 168, 170 of the optical storage medium 80.

In some instances, instructions 26 are executed by the control system 12 to identify multiple data values stored in and on the optical storage medium 80 by directing the laser system 18 to the one or more surfaces 166, 168, 170 of the optical storage medium 80 during rotation. In some embodiments, the optical storage medium 80 is positioned above the base 40. The magnets 42 of the base 40 may use magnetism (e.g., generation of magnetic fields) to control the optical storage medium 80 to oppose gravity (e.g., gravitational force on the optical storage medium 80) to levitate the optical storage medium 80 in a mid-air position 172. The mid-air position 172 may be defined as a distance between the base 40 and the optical storage medium 80. As such, the mid-air position 172 may be controlled by magnetism (e.g., the strength of magnetic fields). The optical storage medium 80 may be rotated upon the axis 162 during levitation. For example, the magnets 42 may maintain the mid-air position 172 and rotate the optical storage medium 80 upon the axis 162. In this manner, relative positions of the optical storage medium 80 between the base 40 and the laser system 18 may be controlled by the control system 12 to enable reading of embedded data from the surfaces 166, 168, 170 of the optical storage medium 80 while the lasers 48 remain in a fixed position. In some instances, levitation may hold the optical storage medium 80 in the mid-air position 172 without rotation. As such, the control system 12 may control the read subsystem 16 to read data from the one or more surfaces 166, 168, 170 during levitation of the optical storage medium 80 through controlling positions of the lasers 48. It should be noted, that the optical storage medium 80 may rotate, levitate, and/or be positioned statically in relation to the base 40.

In some embodiments, the read subsystem 16 may be controlled by the control system 12 to focus a beam of light 174 from a laser 48,176 to read embedded data on the surface 168 of the optical storage medium 80. The beam of light 174 may interact with a location 178 within the optical storage medium 80. The location 178 may include different physical states of the optical storage medium 80 corresponding to stored data. The different physical states may be based on the encoded data embedded into the optical storage medium 80 by the write subsystem 14 causing changes of aspects of the crystal structure of the layers of the optical storage medium 80. The beam of light 174 focused on the location 178 of the optical storage medium 80 may reflect light 174. The reflected light may be detected by a detector

46,182 (e.g., a reader). The detector 46, 182 may read the stored data based on signals generated by the reflected light 180. For example, the detector 46, 182 may read the embedded data (e.g., stored data) from the optical storage medium 80 based on light-matter interaction (e.g., absorption, reflection, refraction, emission, and scattering, and the like) of the beam of light 174 with the optical storage medium 80. In some instances, the location 178 may include different physical states related to changes in a refractive index of the optical storage material. Variance of the refractive index of the optical storage medium 80 at the location 178 may cause changes in an angle of refraction of the reflected light 180. As such, the detector 46, 182 may process the reflected light 180 corresponding to read data using a spectrometer and/or an CCD camera. In this manner, the read subsystem may output the read data to the control system 12. The control system 12 may further process the read data using scan data of the encryption key 100 located in the watermark region 82 of the optical storage medium 80 and provide decryption of the read data.

In certain embodiments, the control system 12 may determine a life expectancy and/or a decay state of the stored data of the optical storage medium 80 based on life span data stored within the header region 84. Assessment of the life expectancy and the decay state of the read data may allow the optical data system 10 to provide a health state of the optical storage medium 80. As such, viability for further storage of the optical storage medium 80 without loss of data may be assessed. With this in mind, the control system 12 may detect the life expectancy of the stored data by controlling the laser system 18 to scan the header region 84. As such, the read subsystem 16 may control a laser 48, 184 to focus a beam of light 186 onto the header region 84 of the optical storage medium 80. The beam of light 186 may interact with the header region 84 and reflect light 188. The reflected light 188 may be detected by a detector 46, 190. The detector may read lifespan data encoded within the header region 84. The lifespan data may be indicative of a predicted useful lifespan and/or a life expectancy associated with the optical storage medium 80. The life expectancy may be based on a writing date of the optical storage medium 80. As such, the control system 12 may analyze the writing date of the optical storage medium 80 to determine an amount of time that has elapsed since the writing date. As such, an elapsed time may be identified between an initial storage (e.g., the write date) of the corresponding value and a respective read (e.g., a read date) of the corresponding value stored on the optical storage medium 80 by the read subsystem 16. Analysis of the elapsed time may be used to determine a remaining life expectancy of the optical storage medium 80 and/or used to determine the health state based on correlation with the decay state. In some embodiments, the stored data read from the header region 84 may allow the optical data system 10 to determine the decay state based on the readability of the stored data. The readability of the stored data is analyzed by the laser system 18 based on an efficacy of the detectors 46 to read the stored data on the surfaces 166, 168, 170 of the optical storage medium 80. Further, the control system 12 may determine the decay state of the stored data based on comparing a known calibration value to a corresponding value stored on the optical storage medium. In some instances, the known calibration may include calibration values recorded on the writing date of the optical storage medium 80 that form a baseline level of the detector's ability to read the embedded data of the optical storage medium 80. In some instances, the known calibration may be determined on a date prior to embedding data onto the optical storage medium 80. The corresponding value, stored on the optical storage medium 80, may include a benchmark value of a readability of the stored data of the optical storage medium 80 in an initial condition (e.g., condition on the writing date). As such, the control system 12 may determine and identify any discrepancies between the known calibration and the corresponding calibration value and generate the decay state of the read data of the optical storage medium 80.

In certain embodiments, the optical data system 10 may scan one or more locations of the optical storage medium 80. This may be triggered based on life expectancy data or the like. In some instances, the one or more locations may include specific sequences of data. The optical data system 10 may read the specific sequences of data from the locations of the optical storage medium 80 and compare the specific sequences of data. In some instances, the specific sequences of data may include anomalies and/or signs of degradation. For example, the specific sequence from of data from a first location may not match the specific sequence of data from a second location one. In this manner, mismatch of the specific sequences of data may indicate a loss of data in the one or more locations. As such, control system 12 may assign the decay state to the optical storage medium 80. In some instances, a probability of data loss and/or a reliability of data may be calculated by the control system 12 based on a number of anomalies and/or signs of degradation (e.g., a percent of mismatch, an ability to read the specific data sequences, and the like). In this manner, the probability of data loss and/or the reliability of data may provide the decay state (e.g., a quantitative value) of the optical storage medium 80.

The control system 12 may correlate the lifespan data (e.g., life expectancy) and the decay state (based on the calibration value, the probability of data loss, and/or the reliability of data) to provide a health state of the optical storage medium 80. The correlation may indicate that the health state of the optical storage medium 80 may be reliable and indicate that further storage of the optical storage medium 80 may be possible. For example, the life expectancy may indicate that the stored data may begin to decay on a particular date. However, in some cases, the stored data may not undergo such decay by the particular date based on the decay state of the optical storage medium 80. As such, the optical storage medium 80 may be able to host the stored data on the one or more layers past the life expectancy. In some embodiments, the control system 12 may receive the health state of the optical storage medium 80 and may determine that the stored data is unreliable based on the health state. As such, the control system 12 may send a notification to the user that the stored data may be unreliable. The notification may suggest limiting use of the stored data and/or provide information regarding transfer of the stored data.

In certain embodiments, the optical storage medium 80 includes the watermark region 82 embedded with the encryption key 100. The control system 12 may control the laser system 18 to direct a laser 48, 192 to focus a beam of light 194 on the watermark region 82. The detector 46, 196 may receive reflected light 198 based on interaction of the beam of light 194 with the watermark region 82. The beam of light 194 (e.g., focused light) may be focused on a focal plane located through facets and/or on a particular layer of the one or more crystal structures of the watermark region 82 of the optical storage medium 80. As such, the reflected light 198 may originate from the focal plane of the laser 48, 192. The detector 46, 196 may read the encryption key 100 based on the reflected light 198. In some instances, the watermark region 82 may be read from one or more angles. The one or more angles may be relative to a position of the lasers 48, 176, 184, 192 of the laser system 18 and/or rotation of the optical storage medium 80 about the axis 162.

In some embodiments, the control system 12 of the optical data system 10 reads the encryption key 100 based on the reflected light 198 and uses the encryption key 100 to decrypt and/or decode stored data from the bulk storage region 86. For example, the control system 12 may control the laser system 18 to direct a laser 48, 192 to focus a beam of light 194 on the watermark region 82 to read out the encryption key 100. In some instances, the beam of light 194 may be controlled by the laser system 18 to scan the watermark region 82 to identify the encryption key 100 within the watermark region 82. The control system 12 may direct the laser system 18 to activate the laser 48, 176 to read embedded data of the bulk storage region 86 and/or other locations on or within the optical storage medium 80 and control the detector 46, 182 to read the embedded data. As such, the encryption key 100 may be used to decrypt the embedded data read by the detector 46, 182 to generate computer readable data. Further, the laser system 18 may emit additional light and detect the additional light interacting with additional layers of the optical storage medium 80 by focusing an emitter 44 on the optical storage medium 80.

Figure 5:
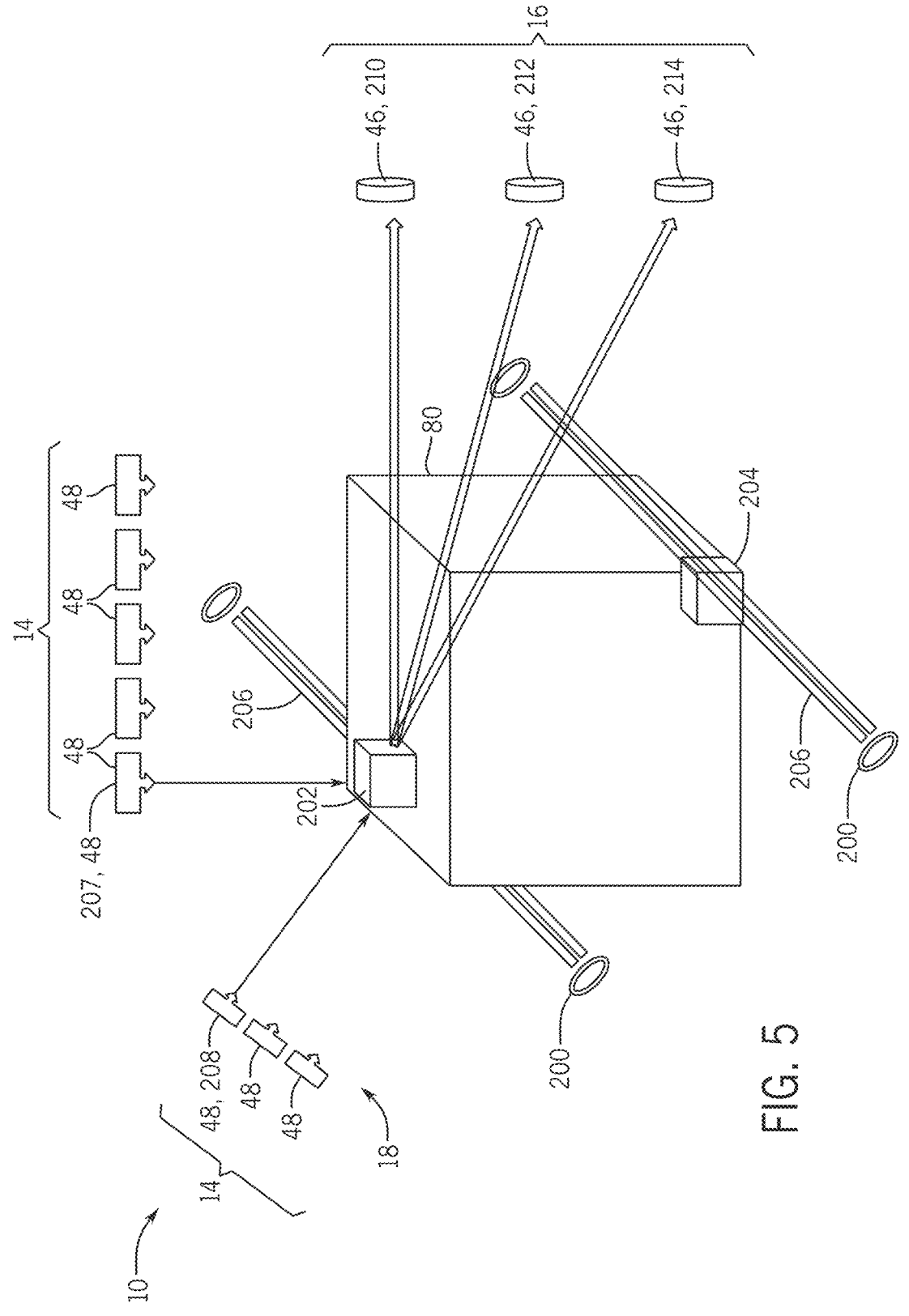
FIG. 5 is a schematic diagram of the optical data system, in accordance with an embodiment of the present disclosure.

FIG. 5 is a schematic diagram of the optical data system 10, in accordance with an embodiment of the present disclosure. The optical data system 10 may include and control operation of the write subsystem 14, the read subsystem 16, the laser system 18, and/or one or more magnets 200. As shown in the illustrated embodiment, the optical storage medium 80 may include one or more chromophore centers that may be altered by the write subsystem 14, the read subsystem 16, the laser system 18, the magnets 200, or a combination thereof. In this manner, the optical storage medium 80 includes a first chromophore center 202 and a second chromophore center 204. The chromophore centers 202, 204 may include one or more active centers of the optical storage medium 80 supporting embedded data. In some embodiments, the magnets 200 may generate one or more magnetic fields 206 within the chromophore centers 202, 204 of the optical storage medium 80. The magnetic fields 206 may tune one or more characteristics of the chromophore centers 202, 204 of the optical storage medium 80.

In certain embodiments, the write subsystem 14 encodes data in the first chromophore center 202 by changing a state of the chromophore center 202 via one or more lasers 48 of the laser system. It should be noted, encryption of the chromophore centers 202, 204 may be based on a physical location of the chromophore centers 202, 204, one or more associated activation energies, emittance spectra, a time of arrival of emission at the read subsystem 16, and the like. As such, the read subsystem 16 may be activated to read the embedded data representative of the stage change of the first chromophore center 202 as one or more light sources (e.g., reflected light, emitted light, scattered light, and the like) reach the one or more detectors 46 of the read subsystem 16. For example, data may be encoded on the first chromophore center 202 by a first laser 48, 208 and/or a second laser 48, 207 of the write subsystem 14. The first laser 208 and the second laser 207 may be controlled to reach the first chromophore center 202 simultaneously, iteratively, or concurrently to embed data within the optical storage medium 80. The first laser 208 may be used at a first power (e.g., 50% laser power, 80% laser power, 100% laser power) and the second laser 207 may be used as a second power (e.g., 60% laser power, 70% laser power, 90% laser power). Additionally and/or alternatively, in some instances power of the lasers 48 may be modulated (e.g., ±1%, ±5%, ±10%, ±20%, and the like).

In some embodiments, the magnets 200 may generate the magnetic field 206 during the use of the write subsystem 14. In this manner, the magnetic field 206 may be varied in strength to change the state of the first chromophore center 202 and/or the second chromophore center 204 of the optical storage medium. In certain embodiments, the read subsystem 16 may be activated at one or more powers (e.g., lower powers of the lasers 48 compared to writing) of the first chromophore center 202 and read via the detectors 46 one or more light signatures representative of chromophore activation by the write subsystem 14. In this way, a first detector 210, a second detector 212, and/or a third detector 214 may read the light signatures (e.g., emission spectra) and provide data from the optical storage medium. It should be noted, that while components of the read subsystem 14, the write subsystem 16, and the laser system 18 are illustrated in two dimensions embodiments of the present disclosure are envisioned with three-dimensional axes of the optical storage medium 80.

Figure 6:
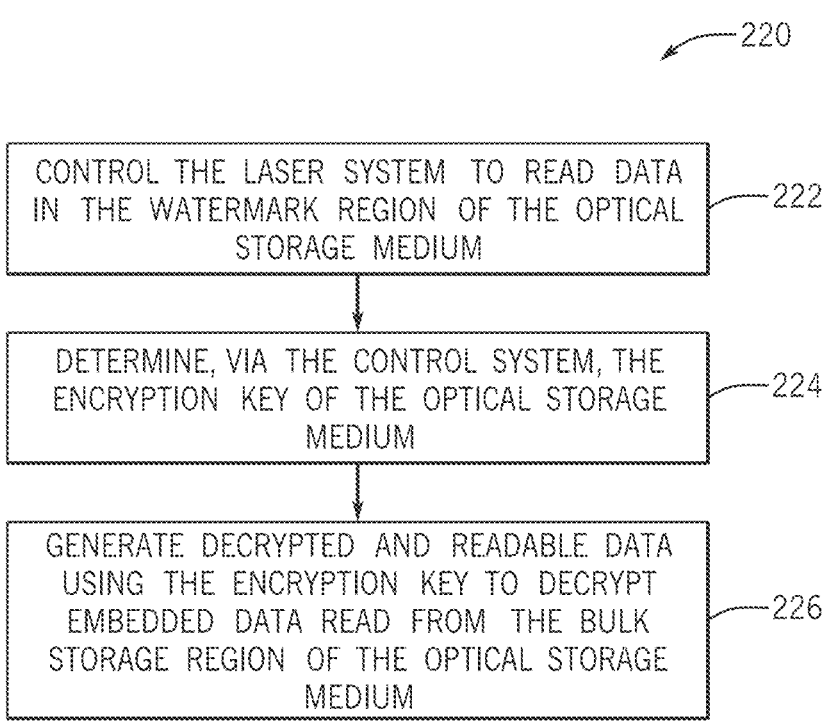
FIG. 6 is flow diagram of a method for decrypting data stored in an embodiment of the optical data system, in accordance with an embodiment of the present disclosure.

FIG. 6 is flow diagram of a method for decrypting data stored in an embodiment of the optical data system, in accordance with an embodiment of the present disclosure. More specifically, FIG. 6 is a flowchart of a process 220 of controlling the control system 12 of the optical data system 10 to generate readable data (e.g., computer readable data) based on decryption of data read by the laser system 18. In the illustrated embodiment, the process 220 includes at block 222 controlling the laser system 18 to read data in the watermark region 82 of the optical storage medium 80. The data may be read using the read subsystem 16 focusing light from the emitters 44 and/or the lasers 48 onto the surfaces of the optical storage medium 80 and then detecting the light after passing through (e.g., transmission) or bouncing off (e.g., scattering) the surfaces of the optical storage medium 80 with the detectors 46. At block 224, the optical data system 10 may determine, via the control system 12, the encryption key 100 of the optical storage medium 80. In some embodiments, the encryption key 100 may be determined by scanning the watermark region 82 and reading the encryption key 100 within the watermark region 82.

At block 226 of the process 220, the optical data system 10 generates decrypted and readable data using the encryption key 100 to decrypt embedded data read by the read subsystem 16 from the bulk storage region 86 of the optical storage medium 80. The optical data system 10 may direct the laser system 18 to read one or more locations of the bulk storage region 86 sending the control system 12 embedded data to decrypt. The embedded data may be analyzed and processed by the control system 12 into readable data. For example, the control system 12 may utilize a decryption algorithm (e.g., Triple Data Encryption Standard, Advanced Encryption Standard, Blowfish, and/or a National Institute of Standards and Technology standardized encryption algorithms) with the encryption key 100 (e.g., symmetric key, asymmetric key) to unscramble data into plain text. In some instances, the decryption algorithm may operate in one or more modes (e.g., cipher block chaining, electronic code blok, and the like) based on size and/or type of the encryption key 100. In some instances, the encryption key 100 may be selected during initial encryption of data based on a level of security. For example the encryption key 100 may include a predetermined number of bits (e.g., 128 bits, 168 bits, 256 bits, and the like). In this manner, the decryption algorithm may output readable data (e.g., plaintext). In some embodiments, the readable data may be provided on the display 32 of the user interface 34.

Figure 7:
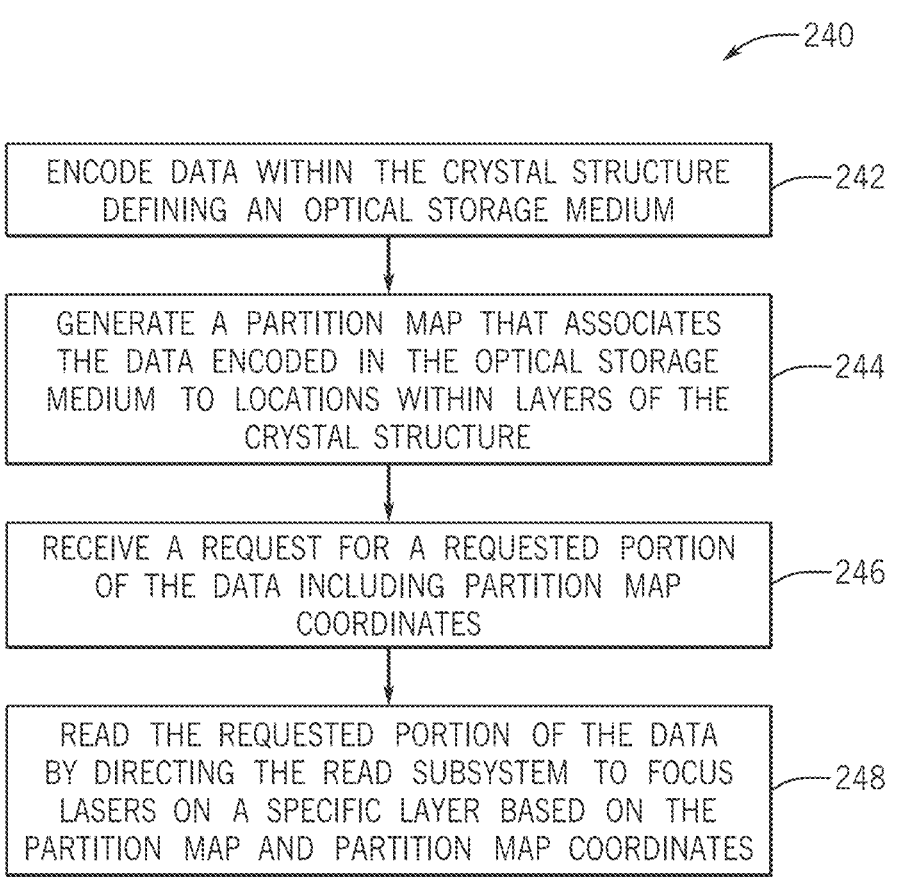
FIG. 7 is flow diagram of a method of operating an embodiment of the optical data system, in accordance with an embodiment of the present disclosure.

FIG. 7 is flow diagram of a method of operating an embodiment of the optical data system, in accordance with an embodiment of the present disclosure. More specifically, FIG. 7 is a flow chart of a process 240 of the optical data system 10 that includes encoding data and generating a partition map. At block 242, the optical data system 10 directs the control system 12 to initiate the write subsystem 14 to encode data within a crystal structure defining the optical storage medium 80. In some embodiments, the data is encoded during the layer-by-layer process of forming the optical storage medium 80. In some instances, the data is encoded into the layers of the optical storage medium 80 after formation of the crystal structure through altering and/or changing a state (e.g., aspects) of the crystal structure.

At block 244, the optical data system 10 generates the partition map that associates the data encoded in the optical storage medium 80 to a location within the layer of the crystal structure. In some embodiments, the partition map is generated using the user interface which may include the partition map dashboard, as discussed in reference to FIG. 2. In alternative embodiments, the partition map is generated after formation of the optical storage medium based on coordinates in which the data is encoded on various layers of the optical storage medium 80.

At block 246, the optical data system 10 may receive a request for a requested portion of the data. In some embodiments, the request may include partition map coordinates associated with a location of the requested portion of the data. In some instances, the requested portion of the data may be located in the watermark region 82, the header region 84, the bulk storage region 86, and/or additional regions of the optical storage medium 80.

At block 248, the control system 12 of the optical data system 10 may read the requested portion of data by directing the read subsystem 14 to focus the lasers 48 on a specific layer of the optical storage medium 80. The specific layer of the optical storage medium 80 may be based on the partition map and partition map coordinates corresponding to the requested portion. In some, non-limiting embodiments, the optical data system 10 may receive various requests to read embedded data on various surfaces on or within the optical storage medium 80.

Figure 8:
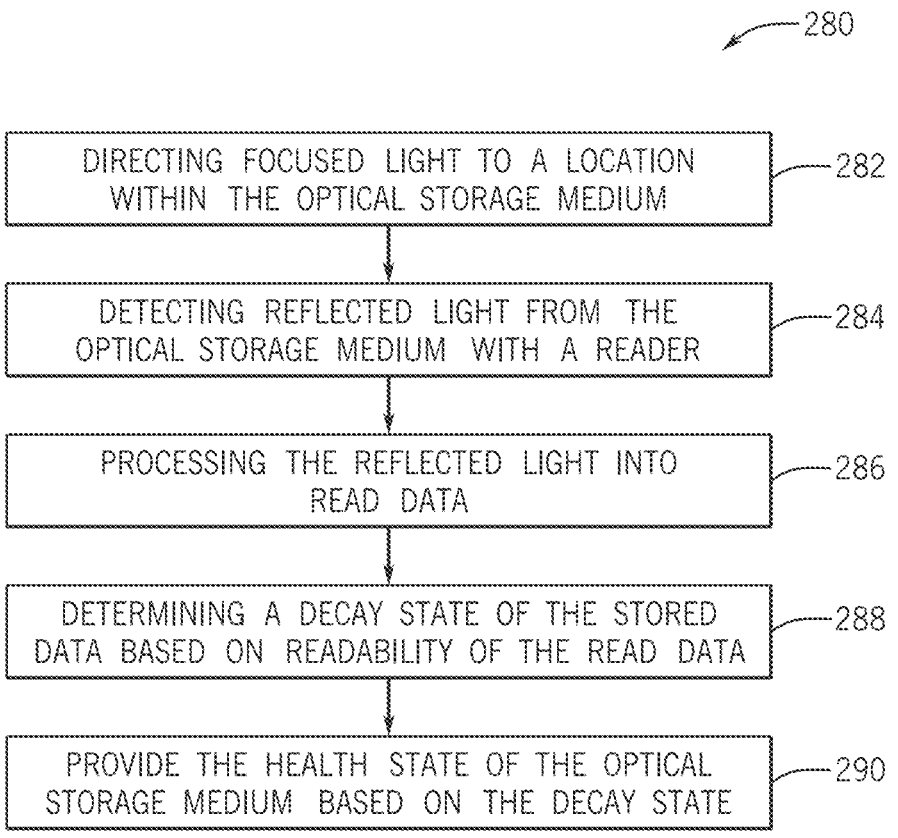
FIG. 8 is a flow diagram of a method for determining a health state of an embodiment of the optical data system, in accordance with an embodiment of the present disclosure.

FIG. 8 is a flow diagram of a method for determining a health state of an embodiment of the optical data system, in accordance with an embodiment of the present disclosure. More specifically, FIG. 8 is a flow chart of a process 280 of the optical data system 10 that includes providing the health state of the optical storage medium 80. At block 282, the optical data system 10 directs focused light to a location within the optical storage medium 80. The focused light may be directed to the header region 84 of the optical storage medium 80.

At block 284, the laser system 18 is directed to detect reflected light from the header region 84 of the optical storage medium 80. The reflected light may be produced as a result of an interaction of the focused light with the header region 84 and/or additional locations within the optical storage medium 80.

At block 286, the control system 12 processes the reflected light into read data (e.g., readable data). In some embodiments, processing may include using the encryption key 100 included in the watermark region 82 to decrypt the data read within the header region 84 of the optical storage medium 80.

At block 288 the process 280, determines the decay state of the stored data based on the readability of the read data. The readability may be determined based on comparison of the read data (e.g., corresponding calibration value) with a known calibration data related to the optical storage medium 80. The correlation may include comparison between the life expectancy and the readability of the optical storage medium 80.

At block 290, the optical data system 10 provides a health state based on the decay state of the optical storage medium 80. In some embodiments, the health state is used to determine a reliability of the embedded data of the optical storage medium 80. In some instances, the optical storage medium 80 provides increased data storage capacities and lifetime when compared to traditional optical storage medium.

While only certain features of the invention have been illustrated and described herein, many modifications and changes will occur to those skilled in the art. It is, therefore, to be understood that the appended claims are intended to cover all such modifications and changes as fall within the true spirit of the invention.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for (perform)ing (a function) . . . " or "step for (perform)ing (a function) . . . ", it is intended that such elements are to be interpreted under 35 U.S.C. 112 (f). However, for any claims containing elements designated in any other manner, it is intended that such elements are not to be interpreted under 35 U.S.C. 112 (f).

The invention claimed is:

1. An optical data system, comprising:
an optical storage medium comprising a watermark region encoded with an encryption key, wherein the encryption key is configured to provide information about embedded data of the optical storage medium;
a read subsystem comprising a base configured to support the optical storage medium, wherein the optical storage medium is positioned above the base;
a laser system configured to focus light from one or more lasers on the optical storage medium, and one or more detectors configured to read the embedded data from the optical storage medium based on the light interacting with the optical storage medium;
a control system comprising one or more processors; and
memory storing instructions executable by the control system to cause the control system to:
levitate the optical storage medium in a mid-air position above the base, wherein the mid-air position is controlled through magnetism; and
control the read subsystem to scan the watermark region to provide scan data, identify the encryption key based on the scan data, and generate computer readable data using the encryption key to decrypt the embedded data from the optical storage medium.

2. The optical data system of claim 1, wherein the control system controls rotation of the base to cause the optical storage medium to rotate about an axis.

3. The optical data system of claim 2, wherein the read subsystem is configured to read data from one or more surfaces of the optical storage medium during rotation of the optical storage medium.

4. The optical data system of claim 1, wherein the read subsystem is configured to read data from one or more surfaces of the optical storage medium during levitation of the optical storage medium.

5. The optical data system of claim 1, wherein the optical storage medium includes one or more crystal structures, and wherein data of the optical storage medium is stored within the one or more crystal structures.

6. The optical data system of claim 1, wherein the one or more detectors of the laser system is a photodetector.

7. The optical data system of claim 1, wherein the one or more lasers of the laser system comprise a pulsed laser, a continuous wave laser, a quasi-continuous wave laser, or any combination thereof.

8. The optical data system of claim 1, wherein:
the optical storage medium comprises a layered crystalline structure; and
the watermark region comprises a layer of the optical storage medium.

9. The optical data system of claim 1, comprising a write subsystem configured to direct the control system to control the laser system to write to the optical storage medium on or through one or more surfaces of the optical storage medium by focusing two or more lasers on a location of the optical storage medium to write the embedded data based on the encryption key.

10. The optical data system of claim 1, comprising a write subsystem configured to direct the control system to generate the watermark region by encoding the encryption key by changing a state of a first crystal structure of one or more crystal structures of the optical storage medium to a second crystal structure.

11. An optical data system, comprising:
an optical storage medium, wherein the optical storage medium includes one or more crystal structures;
a watermark region of the optical storage medium, wherein the watermark region is encoded with an encryption key for decoding embedded data stored on the optical storage medium, and wherein the watermark region is encoded with the encryption key via a state change between a first crystal structure of the one or more crystal structures of the optical storage medium and a second crystal structure;
a base configured to support the optical storage medium and rotate the optical storage medium about an axis;
a laser system comprising one or more lasers configured to focus light on or through one or more surfaces of the optical storage medium, and one or more detectors configured to read the embedded data stored in the second crystal structure of the watermark region of the optical storage medium based on the light interacting with the optical storage medium;
a control system comprising one or more processors; and
memory storing instructions executable by the control system to cause the control system to:
control rotation of the optical storage medium about the axis;
control the laser system to focus the light on the watermark region and control the one or more detectors to read the encryption key based on an interaction of the light with the watermark region;

control the laser system to focus the light on other locations on or within the optical storage medium and control the one or more detectors to read the embedded data; and
generate computer readable data using the encryption key to decrypt the embedded data read by the one or more detectors.

12. The optical data system of claim 11, wherein:
the optical storage medium comprises a multifaceted crystalline structure; and
the watermark region is defined by a layer or surface of a single facet of the multifaceted crystalline structure.

13. The optical data system of claim 11, wherein:
the control system is configured to control rotation, levitation, or both of the optical storage medium via magnets of the base; and
the laser system is configured to read data from one or more surfaces of the optical storage medium during rotation, levitation, or both of the optical storage medium.

14. The optical data system of claim 11, wherein:
the optical storage medium includes one or more crystal structures; and
the laser system is configured to read the embedded data by focusing light through facets onto particular layers of the one or more crystal structures.

15. The optical data system of claim 11, wherein the one or more detectors of the laser system is a photodetector.

16. A method comprising:
controlling, via a control system, rotation, levitation, or both of an optical storage medium via magnets of a base;
controlling, via the control system, a laser system to read data within a watermark region of the optical storage medium and to read embedded data within a bulk storage region of the optical storage medium during rotation, levitation, or both of the optical storage medium;
determining, via the control system, an encryption key based on the data within the watermark region of the optical storage medium; and
generating, via the control system, decrypted and readable data using the encryption key to decrypt the embedded data read from the bulk storage region of the optical storage medium.

17. The method of claim 16, comprising:
activating a laser system to focus light from a plurality of lasers on one or more surfaces of the optical storage medium;
analyzing additional data from the one or more surfaces of the optical storage medium based on the light interacting with the one or more surfaces; and
controlling the control system to direct the laser system to write the additional data to the optical storage medium by changing a state of a portion of the optical storage medium with the light.

18. The method of claim 16, comprising defining the watermark region with the control system based on input coordinates corresponding to one or more geometric regions of the optical storage medium.

19. The method of claim 16, comprising:
levitating the optical storage medium above a base via magnetics; and
rotating the optical storage medium around an axis via the magnetics.

20. The method of claim 19, comprising:

reading the watermark region of the optical storage medium from one or more angles.

\* \* \* \* \*